US012280959B2

(12) United States Patent
Czapp et al.

(10) Patent No.: US 12,280,959 B2
(45) Date of Patent: Apr. 22, 2025

(54) CARRIER BASKET TRANSPORTER WITH SELF-DAMPING CARRIER BASKET PIVOT CONNECTION

(71) Applicant: Franke Technology and Trademark Ltd., Hergiswil (CH)

(72) Inventors: Ireneusz Czapp, Reda (PL); Andrzej Tusk, Rotmanka (PL); Wojciech Lebkowski, Rumia (PL)

(73) Assignee: Franke Technology and Trademark Ltd., Hergiswil (CH)

( * ) Notice: Subject to any disclaimer, the term of this patent is extended or adjusted under 35 U.S.C. 154(b) by 105 days.

(21) Appl. No.: 18/462,570

(22) Filed: Sep. 7, 2023

(65) Prior Publication Data

US 2024/0083683 A1    Mar. 14, 2024

Related U.S. Application Data

(60) Provisional application No. 63/405,161, filed on Sep. 9, 2022.

(51) Int. Cl.
*B65G 17/48* (2006.01)
*B65G 17/12* (2006.01)
(Continued)

(52) U.S. Cl.
CPC ........... *B65G 17/123* (2013.01); *B65G 17/34* (2013.01); *B65G 17/485* (2013.01); *B65G 47/57* (2013.01);
(Continued)

(58) Field of Classification Search
CPC ...... B65G 17/34; B65G 17/36; B65G 17/123; B65G 17/12; B65G 17/14;
(Continued)

(56) References Cited

U.S. PATENT DOCUMENTS 1,736,472 A * 11/1929 Wego ................ B65G 17/12
198/801
3,091,189 A    5/1963 Becker
(Continued)

*Primary Examiner* — Mark A Deuble
(74) *Attorney, Agent, or Firm* — Volpe Koenig

(57) ABSTRACT

A self-damping carrier basket pivot connection for a carrier basket transporter system having cars configured to travel along a pathway, at least some of which have a carrier basket pivotally connected thereto. The pivot connection includes a support connection configured for attachment a car. The support connection has at least three connection rollers that define a circular envelope and a mating connection configured to be attached to a back support of the carrier basket. The mating connection includes a housing with a part circular track that generally corresponds to or is larger than the circular envelope such that the rollers can be located within the part circular track. The part circular track includes at least one inwardly directed protrusion. The connection rollers engage in the part circular track such that the carrier basket is adapted to be pivotable by gravity so a product support surface of the carrier basket is maintained generally horizontal during movement of the carrier basket along the pathway, and the at least one inwardly directed protrusion provides an increased resistance to relative movement between the housing and a roller that contacts the protrusion.

17 Claims, 16 Drawing Sheets

(51) Int. Cl.
  *B65G 17/34* (2006.01)
  *B65G 47/57* (2006.01)
  *B65G 17/14* (2006.01)

(52) U.S. Cl.
  CPC .............. *B65G 17/12* (2013.01); *B65G 17/14* (2013.01); *B65G 2201/0202* (2013.01)

(58) Field of Classification Search
  CPC ............ B65G 2201/0202; B65G 17/16; B65G 17/485; B65G 35/00
  USPC ................................................ 198/787, 891
  See application file for complete search history.

(56) References Cited

U.S. PATENT DOCUMENTS

| | | | |
|---|---|---|---|
| 3,253,552 A | 5/1966 | Stein | |
| 3,447,664 A * | 6/1969 | Goedkoop | E04H 6/187 198/795 |
| 4,471,867 A | 9/1984 | Forshee | |
| 4,838,410 A * | 6/1989 | Gough | B65G 17/22 198/801 |
| 4,846,337 A * | 7/1989 | Kuhlmann | B65G 17/14 198/801 |
| 4,957,188 A * | 9/1990 | Bavis | B65G 21/22 186/14 |
| 5,101,963 A * | 4/1992 | Skarlupka | B65G 17/123 198/838 |
| 6,321,899 B1 * | 11/2001 | Hannessen | B65G 17/18 198/475.1 |
| 6,554,105 B2 * | 4/2003 | Brown | B65G 17/123 186/41 |
| 7,708,135 B2 | 5/2010 | Ellerth et al. | |
| 8,770,385 B2 * | 7/2014 | Hannessen | B65G 47/57 198/607 |
| 10,633,195 B2 * | 4/2020 | Gadliger | B65G 47/57 |
| 11,225,380 B2 * | 1/2022 | Czapp | B65G 17/485 |
| 12,172,842 B2 * | 12/2024 | Hagenbuch | B65G 17/34 |
| 2021/0094761 A1 | 4/2021 | Czapp et al. | |
| 2024/0132288 A1 * | 4/2024 | Sung | B65G 17/18 |

* cited by examiner

CARRIER BASKET TRANSPORTER WITH SELF-DAMPING CARRIER BASKET PIVOT CONNECTION

CROSS-REFERENCE TO RELATED APPLICATIONS

This application claims the benefit of U.S. Provisional Application No. 63/405,161, filed Sep. 9, 2022, which is incorporated herein by reference as if fully set forth.

TECHNICAL FIELD

The present invention relates to the field of conveyor systems for use in moving products, such as delivery of orders in chain restaurants, bars, cafeterias, or the like. More particularly, the invention relates to a system for supporting and stabilizing the carrier basket as it is moved along by the conveyor between the loading and/or unloading stations.

BACKGROUND

Applicant has developed and markets an overhead conveyor system which is based on a continuous track made up into a closed loop that contains an endless "train" of small wheeled cars connected together. The track is normally suspended from the ceiling or wall and can be made to snake through a building from a loading point to an unloading point and back again. Food products to be transported need to be in packages or bags, which are placed in carrier baskets carried by some of the wheeled cars. Various means may be provided to unload or release the packages or bags from the carrier basket and place the food into a holding tray.

Another food transport system for the vertical transport of packaged food items from one floor of a restaurant to another floor is described in U.S. Pat. No. 7,708,135. The food transport system includes a conveyor that transports food-item supporting carriers along a closed-loop pathway defined by a belt or chain, to which the carriers are pivotably connected. Although the transport of food items placed on supporting carriers is convenient, the belt or chain-based conveyor provide less design flexibility in terms of space utilization and winding transport pathways.

US 2021/0094761 of the Applicant is also directed to a conveyor system for the transport of packaged food items in restaurants, etc., which allows a flexible design of layouts. This provides a track-based conveyor system with supporting carriers on which food items to be transported can be placed at a loading station. The food items are then transported to a customer delivery point which is remote from the loading station. Here, the packaged items are loaded onto the carriers at loading and unloading stations. In one preferred arrangement, the carriers are defined by baskets (carrier baskets) having a series of support fingers cantilevered from a single back support that is pivotally mounted to a car that can travel in a conveyor track. The carrier support fingers are aligned with spaces located between loading/unloading station support fingers or rollers. The entire content of US 2021/0094761 is incorporated herein by reference as if fully set forth.

Although the known arrangements have been successful in operation, it would be desirable to improve the function of the system with respect to damping or suppressing swinging movements of the carrier basket as it moves along the pathway defined by the conveyor.

SUMMARY

The present disclosure is directed to a self-damping carrier basket pivot connection for a carrier basket transporter system with a plurality of cars configured to travel along a pathway, at least some of which have a carrier basket pivotally connected thereto. The self-damping carrier basket pivot connection includes a support connection configured for attachment to at least one of the cars, with the support connection having at least three connection rollers that define a circular envelope. In preferred carrier basket transport systems, support connections are provided on several of the cars, and arrangements are also provided wherein a support connection is connected to a group of two of the cars in order to provide increased weight carrying capacity. The self-damping carrier basket pivot connection further includes a mating connection configured to be attached to a back support of a carrier basket. The mating connection includes a housing comprising a part circular track having a first radius and that extends circumferentially greater than 180° and generally corresponds to or is larger than the circular envelope such that the rollers can be located within the part circular track. The part circular track includes at least one inwardly directed protrusion. The connection rollers are engaged in the part circular track such that the carrier basket is adapted to be pivotable by gravity so a product support surface of the carrier basket is maintained generally horizontal during movement of the carrier basket along the pathway, and the at least one inwardly directed protrusion provides an increased resistance to relative movement between the housing and at least one of the rollers that contacts the at least one inwardly directed protrusion.

In one embodiment, the connection rollers include an outer surface made of an elastomeric material.

In a preferred arrangement, the at least three connection rollers includes four of the connection rollers arranged with axes thereof defining corners of a square.

In one embodiment, the at least one inwardly directed protrusion comprises a plurality of the inwardly directed protrusions. Preferably, the inwardly directed protrusions are formed by ends of arc-shaped segments having a second radius, smaller than the first radius, that define a portion of the part circular track and are arranged generally at a distance of first radius such that the inwardly directed protrusions extend radially inwardly from a circle defined by the first radius. In a particularly preferred embodiment, the connection rollers have a roller radius and the second radius is greater than or equal to the roller radius.

In one embodiment, there are at least six of the arc-shaped segments, and more preferably eight of the arc-shaped segments.

Preferably, the arc-shaped segments are located at a top part of the housing. This is relative to a position of the housing in use in the carrier basket transporter system.

Preferably, a bottom part of the housing is open, which limits the length that the part circular track extends. Preferably, the part circular track extends about 270° circumferentially; however, it could extend further.

In one arrangement, first and second lips extend radially inwardly along each side of the part circular track in order to retain the housing on the connection rollers.

In a preferred embodiment, the circular envelope has a radius that is smaller than the first radius of the part circular track. This allows the connection rollers that contact the at least one protrusion to pass by the protrusion (by the housing shifting upwardly) and allows the attached carrier basket to pivot. Here increased weight on the carrier basket increases the damping action of the connection roller(s) contacting and passing by the at least one of the inwardly directed protrusions. Alternatively or in addition, the surface of the rollers can elastically deflect to allow the roller to pass by the at least one of the inwardly directed protrusions.

In one embodiment, the housing includes a carrier basket connector. This allows the mating connection to be affixed, preferably to the back support, of a carrier basket.

In another aspect, a carrier basket transporter system is provided. The system includes a plurality of cars configured to travel along a pathway, with at least one of the cars, and preferably several of the cars, having a self-damping carrier basket pivot connection connected thereto. The self-damping carrier basket pivot connection includes a support connection attached to the at least one of the cars, and the support connection comprises at least three connection rollers that define a circular envelope. A carrier basket having a back support and a product support surface extending therefrom is also provided, and a mating connection is attached to the back support. The mating connection includes a housing having a part circular track having a first radius and that extends circumferentially greater than 180° and generally corresponds to or is larger than the circular envelope. The part circular track includes at least one inwardly directed protrusion. The connection rollers are engaged in the part circular track such that the carrier basket is pivotable by gravity so the product support surface is maintained generally horizontal during movement of the carrier basket along the pathway, and the at least one inwardly directed protrusion provides an increased resistance to relative movement between the housing and at least one of the connection rollers that contacts the at least one inwardly directed protrusion.

In one preferred arrangement, a support plate is provided that is connected to two of the cars, and the support connection is attached to the support plate. This provides for increased weight carrying capacity. However, the support connection could also be affixed or attached to a single car or to more than two cars.

In one preferred arrangement, support rollers are located on the support plate, at least one of which is configured to contact the back support at a location spaced apart from the support connection. This provides additional support for a carrier basket in order to transfer cantilevered loads from the carrier basket to the track system that forms the pathway.

In one preferred arrangement, the product support surface comprises a plurality of spaced apart fingers. This allows for use with certain types of loading and unloading stations that are located along the pathway in order to load and unload a carrier basket.

In one preferred embodiment, the cars include track rollers that are configured to ride on a track that defines the pathway. However, track rollers are not required and other types of slide blocks or other low friction guides could be used.

The various features noted above can be used alone or in various combination to provide enhanced damping of swinging movements of a carrier basket as it moves along the pathway. This is particularly useful at loading and unloading stations of carrier basket transporter systems.

BRIEF DESCRIPTION OF THE DRAWINGS

Further advantages and characteristics of the invention will become apparent by the below description of embodiments making reference to the accompanying drawings, in which.

DETAILED DESCRIPTION

Figure 1:
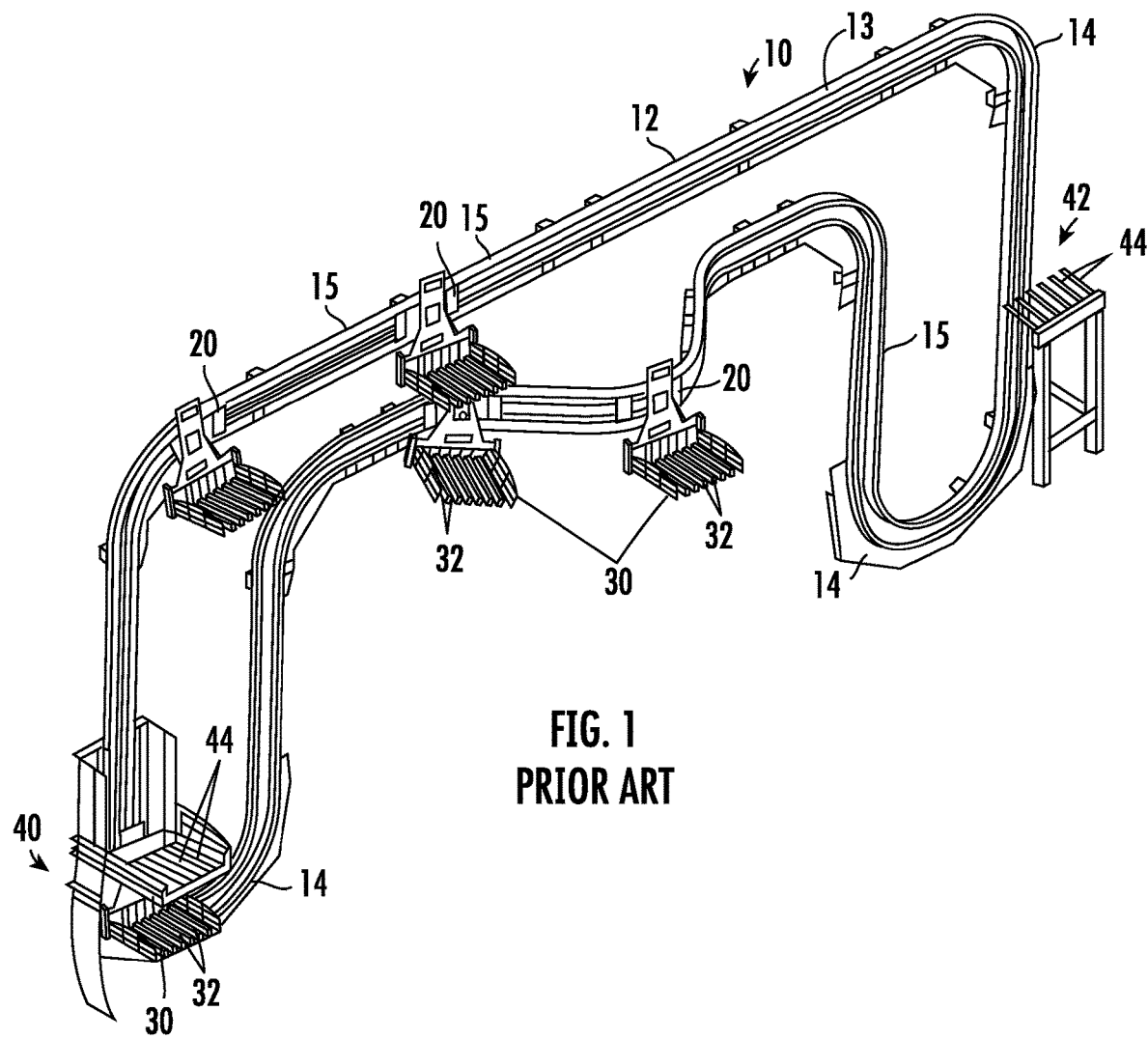
FIG. 1 is perspective view of a prior art carrier basket transporter system which includes a track that defines a pathway along which a plurality of cars travel in order to move one or more carrier baskets between a loading station and an unloading station.

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof. The terms approximately or generally mean within +/−10% of a specified value unless otherwise noted, and within +/−25° of a specified angle or direction.

FIG. 1 is a view showing an embodiment of Applicant's conveyor system 10 from U.S. 2021/0094761, which is incorporated herein by reference as if fully set forth. This includes a pathway 12 defined by a track 13 having one or more curved portions 14 as well as straight segments 15 in which a plurality of cars 20 are guided. A motor drives the cars 20 along the track 13 either via having the cars 20 directly linked to one another or having intermediate portions located between the cars 20. Respective carrier baskets 30 are pivotally mounted to at least some of the cars 20, with each carrier basket 30 including carrier support fingers 32 that are cantilevered from the side of the carrier basket 30 that is pivotally mounted to the cars 20. At least one of a loading station 40 or an unloading station 42 is preferably located along the pathway 12. The loading and unloading stations 40, 42 include support fingers 44 that are used to remove an item being transported from the carrier basket 30 by the carrier basket support fingers 32 moving between the loading or unloading station support fingers 44 to either pick-up or drop-off the item being transported via the conveyor system 10. These support fingers 44 can be powered, i.e., formed by powered rollers, belts or chains, in order to further carry the item along a transport or delivery path. As discussed in U.S. 2021/0094761, the conveyor system 10 allows enhanced flexibility for the design of layouts in order to suit particular applications and space requirements.

Figure 9:
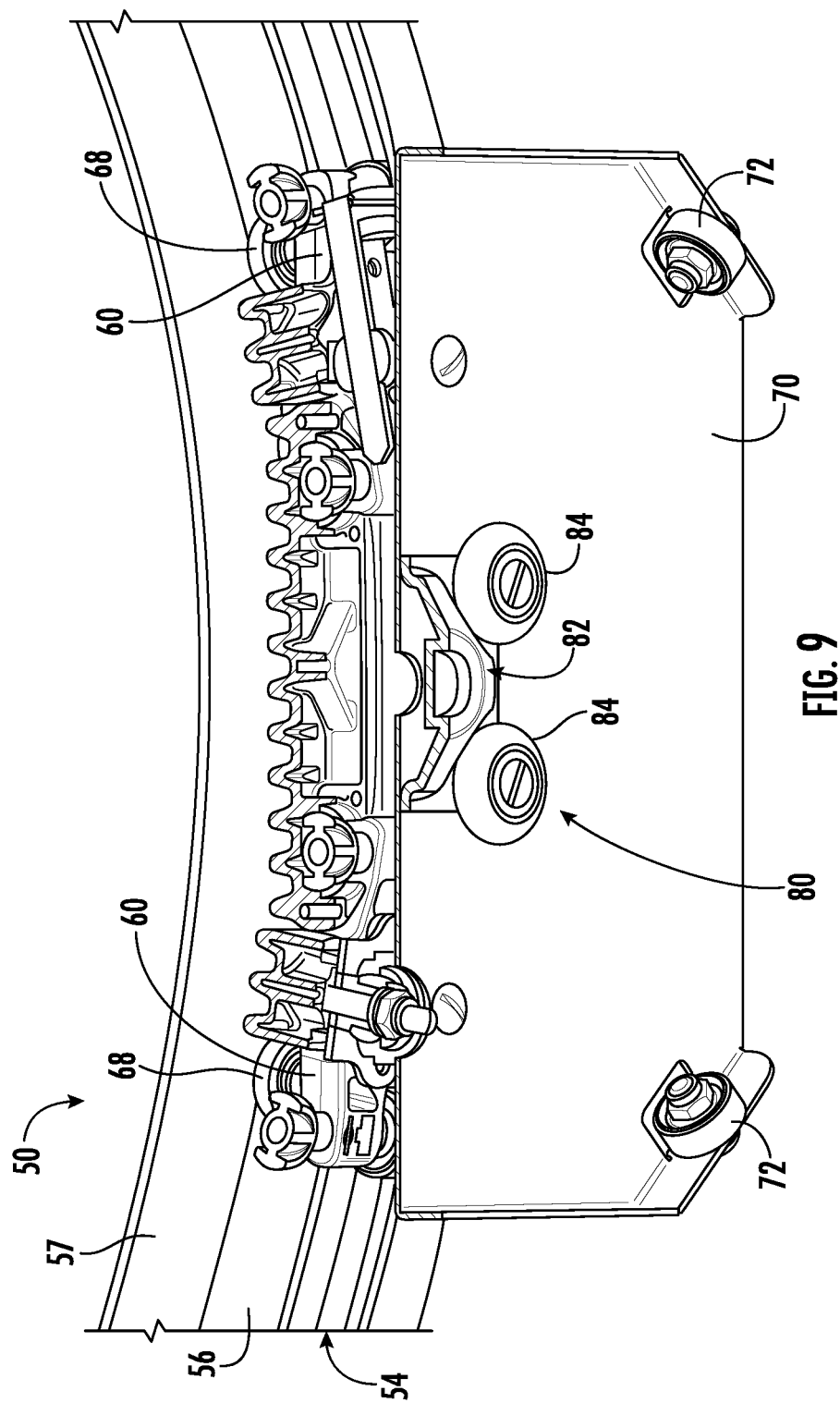
FIG. 9 is a cross-sectional view through the support plate as well as portion of the self-damping carrier basket pivot connection located thereon traveling along a portion of the pathway.
Figure 10:
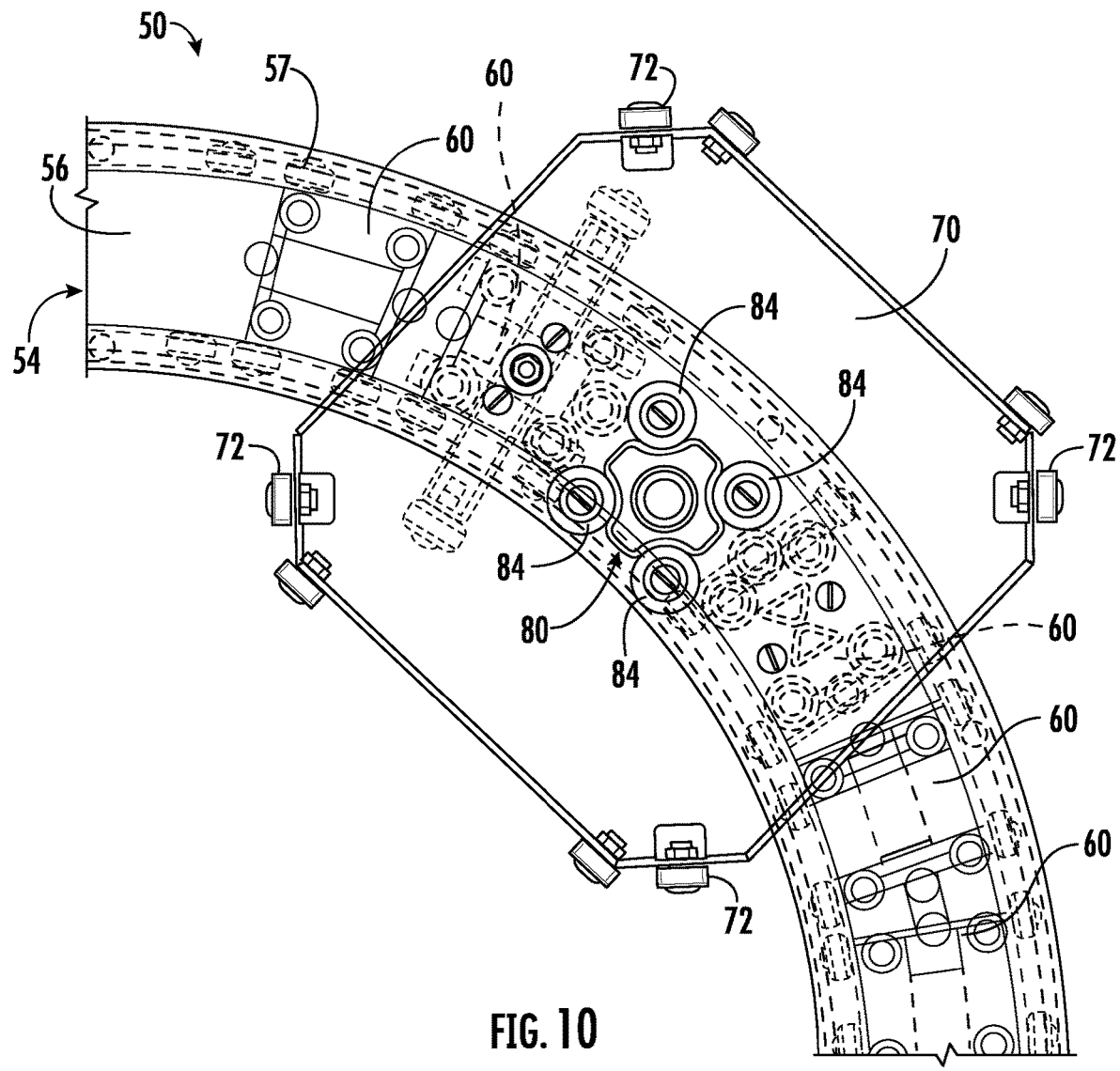
FIG. 10 is an elevational view showing the support plate with the support connection of the self-damping carrier basket pivot connection located thereon traversing a vertical curve of the carrier basket transporter system.
Figure 11:
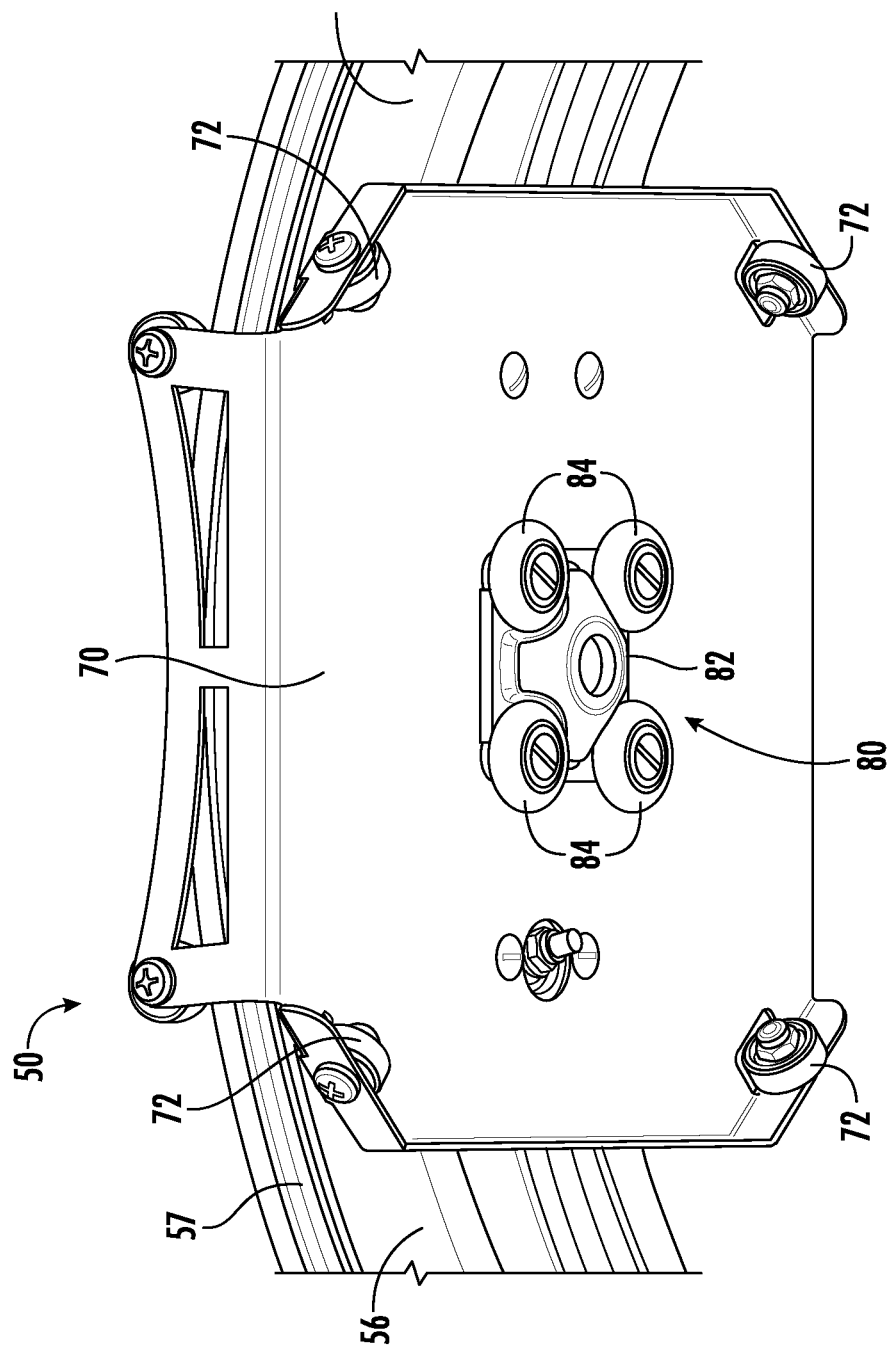
FIG. 11 is a perspective view showing the support connection of the self-damping carrier basket pivot connection located on the support plate traversing a horizontal curve along the pathway of the carrier basket transporter system.
Figure 12:
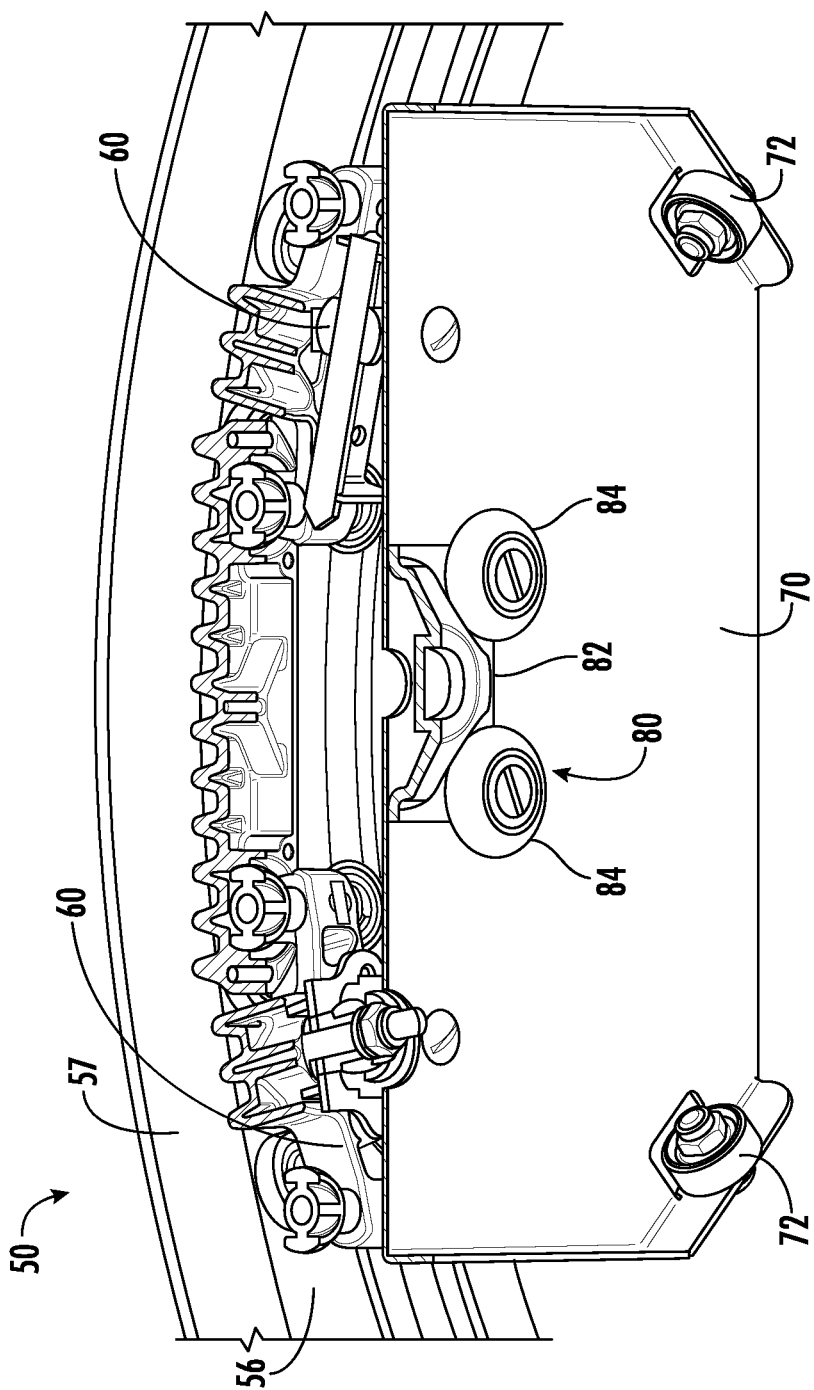
FIG. 12 is a cross-sectional view similar to FIG. 9 showing the support plate connected two cars traversing an inside horizontal curve along the pathway of the carrier basket transporter system.
Figure 13:
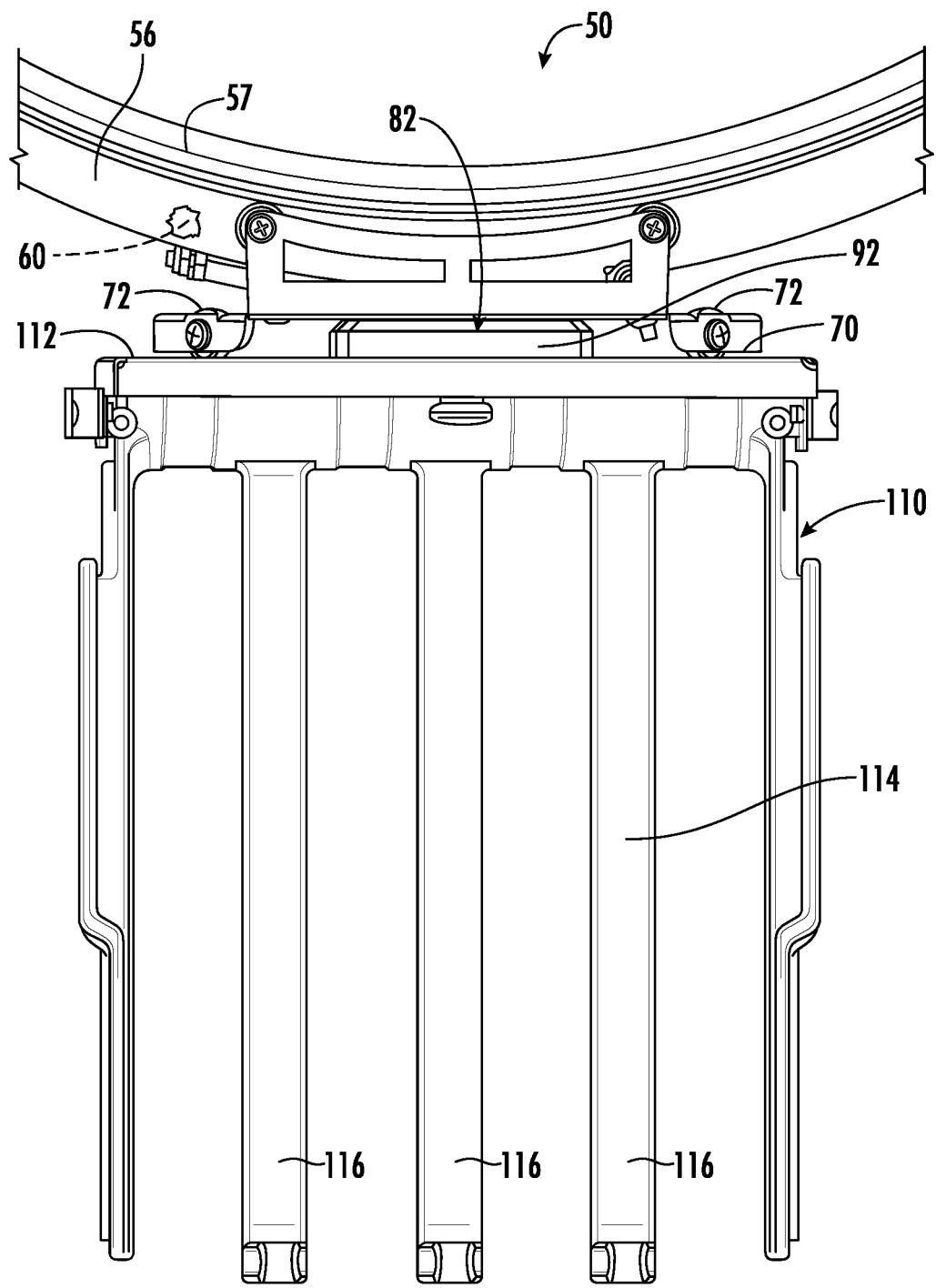
FIG. 13 is a top view at an outside horizontal curve of the carrier basket transporter system showing the support plate having the self-damping carrier basket pivot connection attaching the carrier basket to the support plate.
Figure 14:
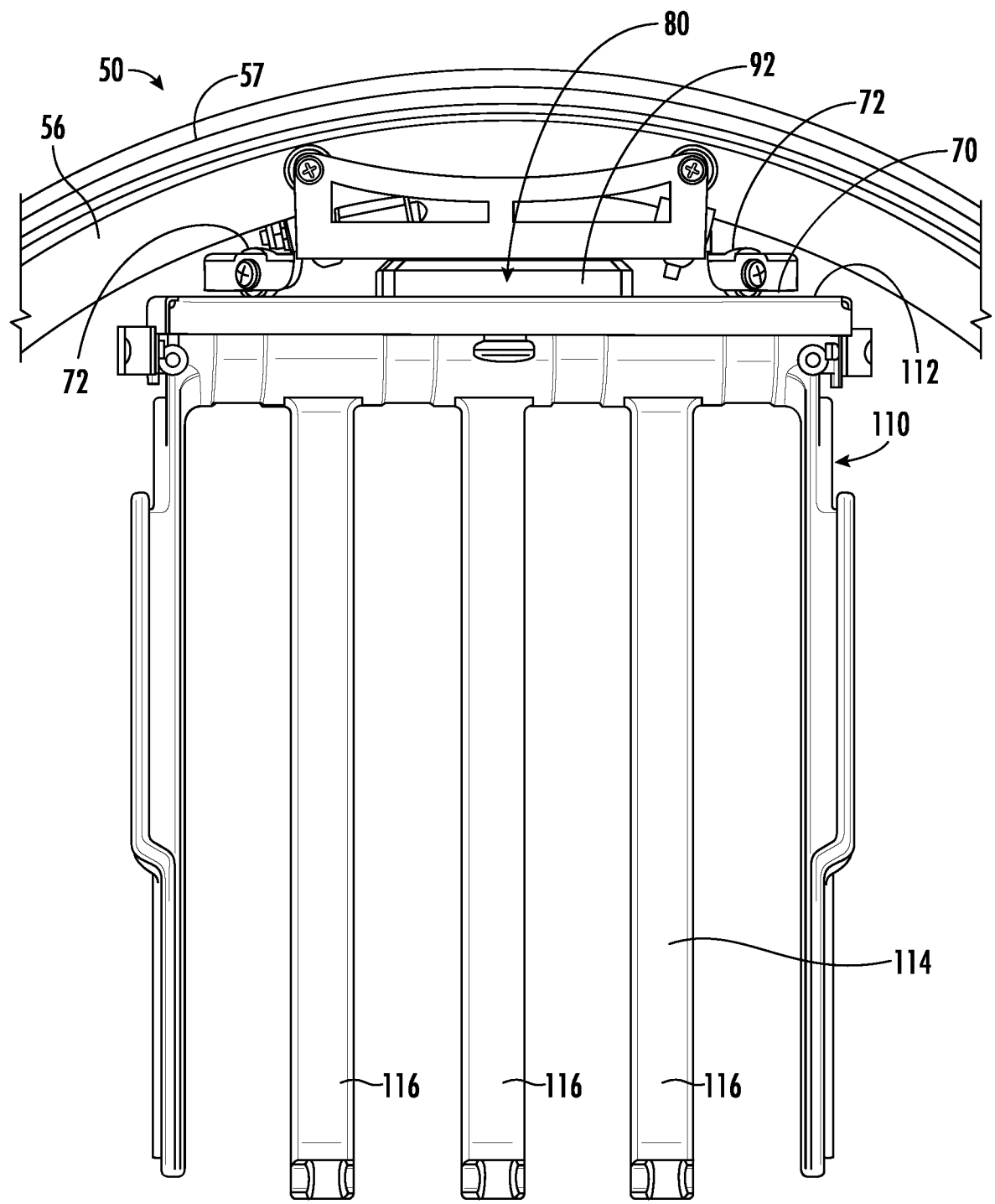
FIG. 14 is a top view at an inside horizontal curve of the carrier basket transporter system showing the support plate having the self-damping carrier basket pivot connection attaching the carrier basket to the support plate.
Figure 15:
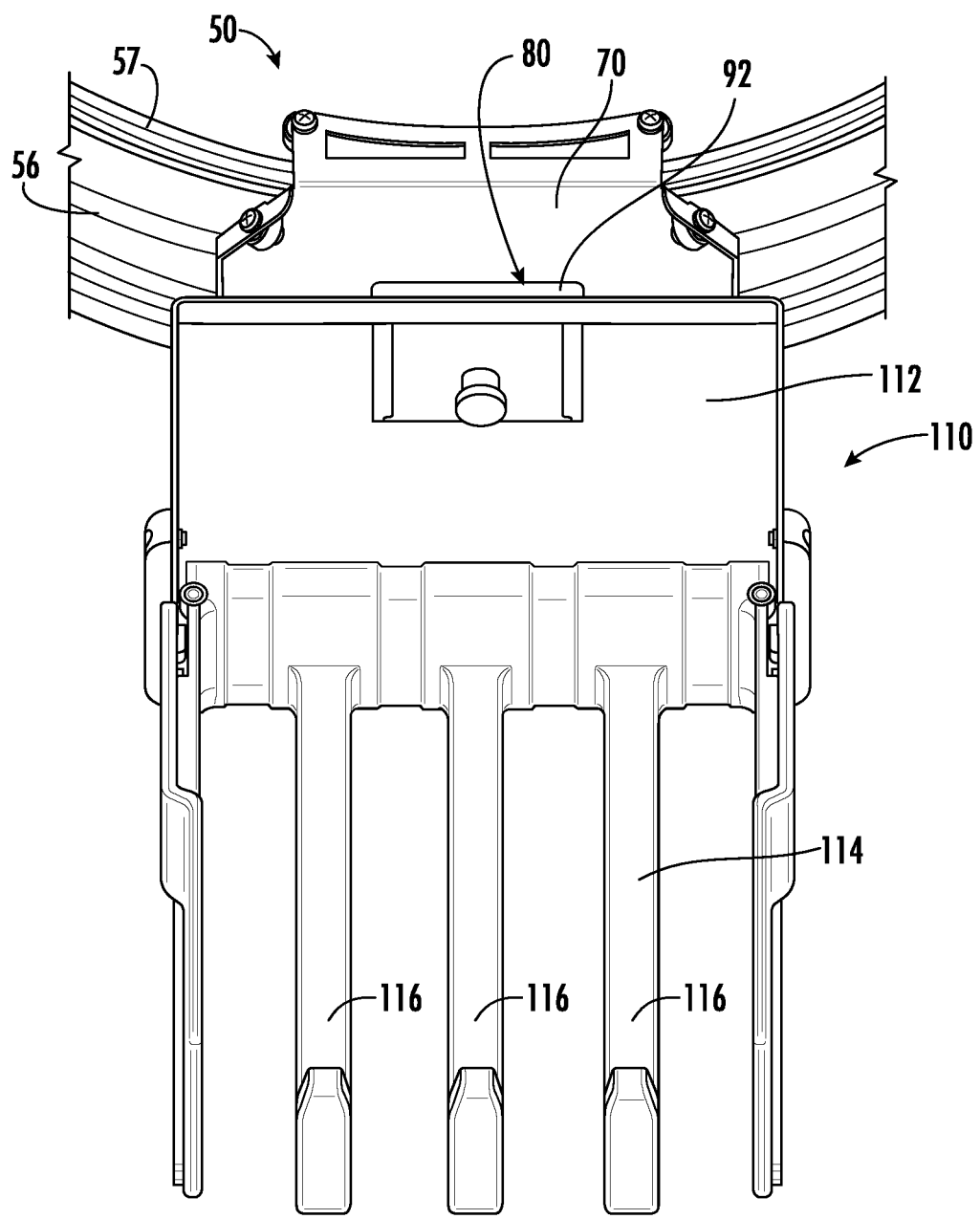
FIG. 15 is a perspective view showing a carrier basket connected via the self-damping carrier basket pivot connection to the support plate that is carried by two of the cars.
Figure 16:
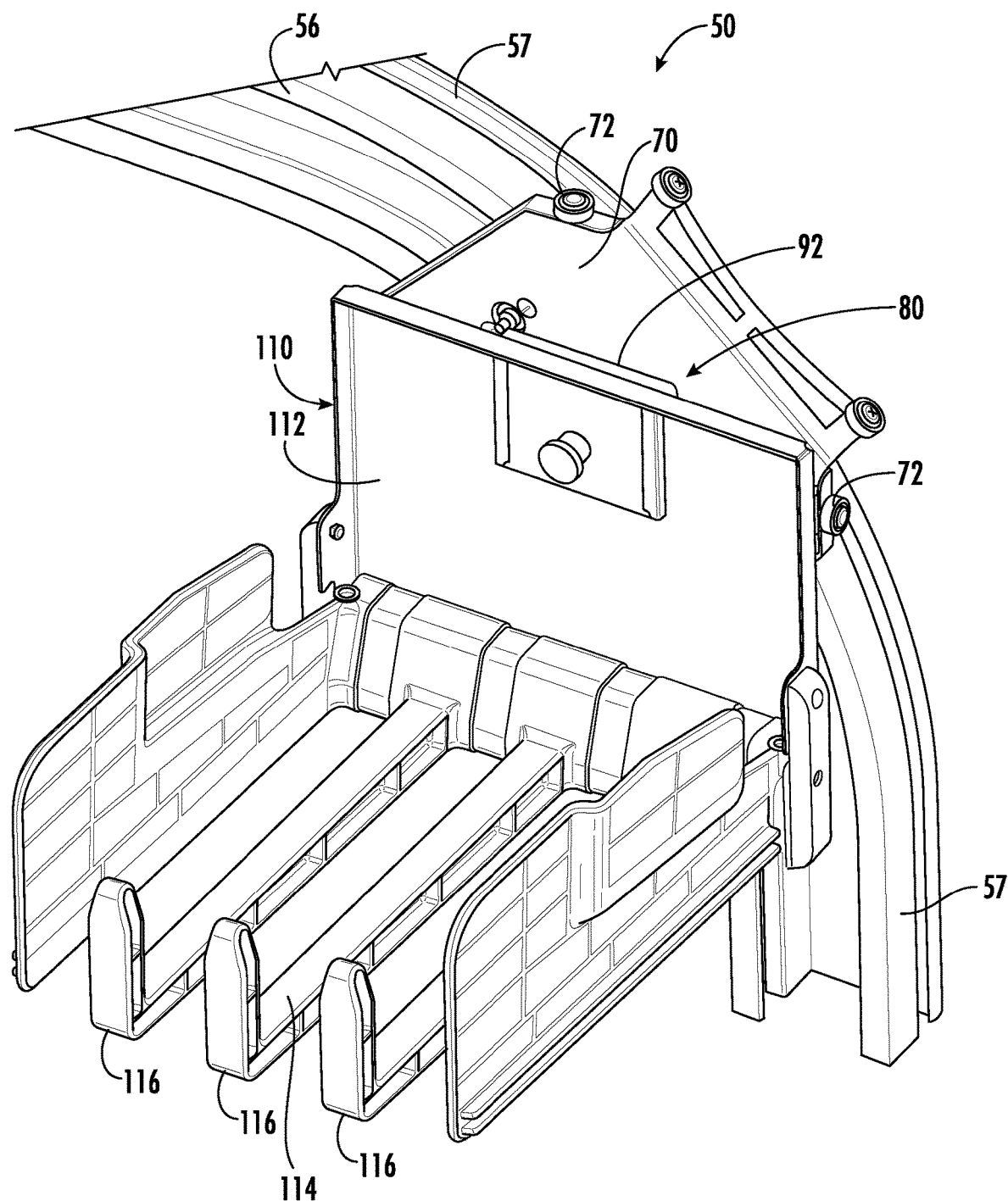
FIG. 16 is a perspective view showing the arrangement in FIG. 15 traversing a vertical curve along the pathway of the carrier basket transporter system.

Referring to FIGS. 2-16, an embodiment of a carrier basket transporter system 50 for a carrier basket 110 having a self-damping carrier basket pivot connection 80 in accordance with the present disclosure is shown. The carrier basket transporter system 50 includes a conveyor 54 (indicated in FIGS. 9 and 10), similar to the conveyor system 10 disclosed in FIG. 1, that has a pathway 56 along which the carrier baskets 110 are carried. The pathway 56 is defined by tracks 57, similar to the track 13 discussed above, that can be arranged in various configurations having curved portions as well as straight segments in order to move products, which can be for example fast food, that is placed in the carrier basket 110, preferably between loading and unloading stations, such as 40 and 42 shown in FIG. 1.

Figure 2:
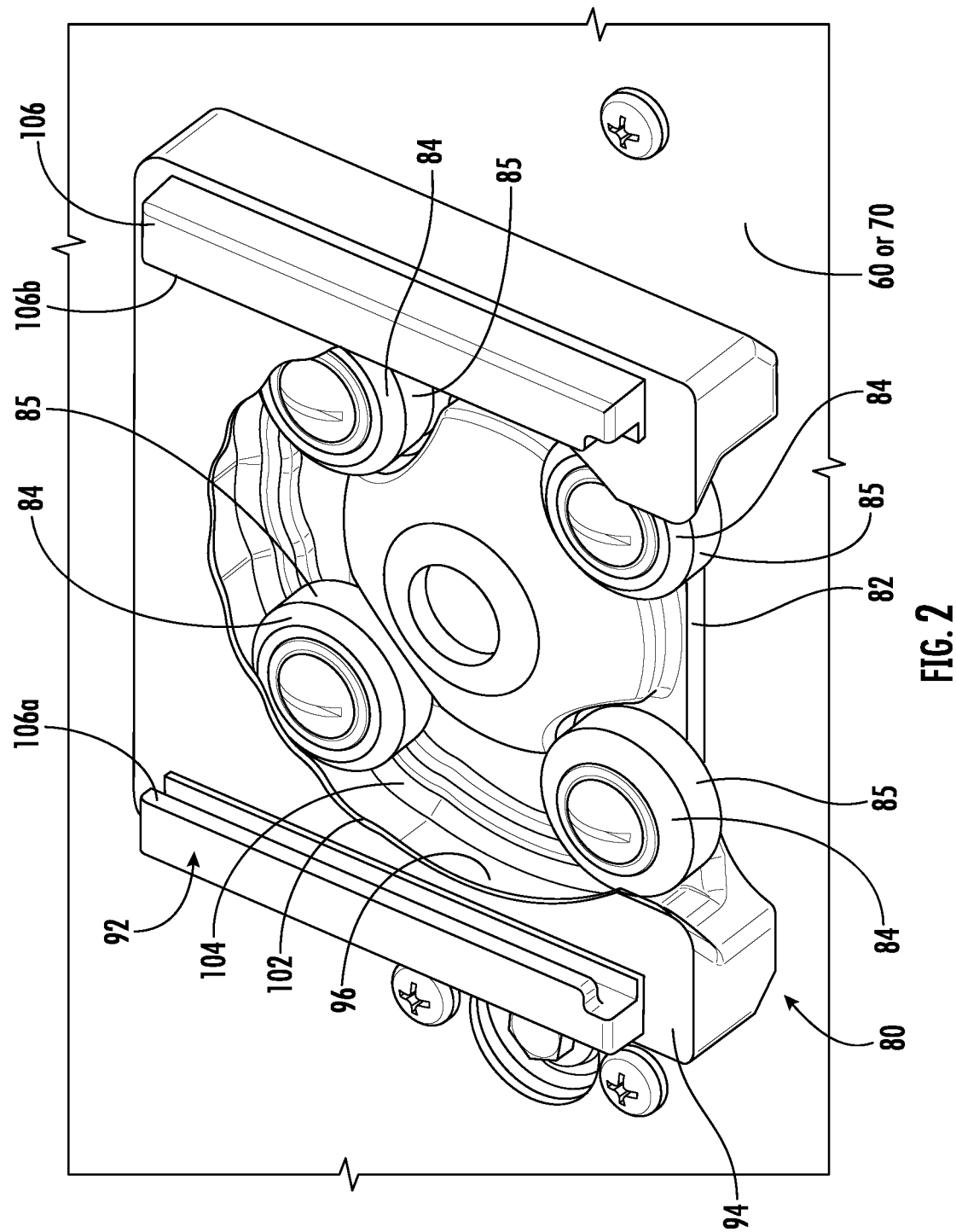
FIG. 2 is a perspective view of self-damping carrier basket pivot connection that can be used in connection with a carrier basket transporter system.
Figure 3:
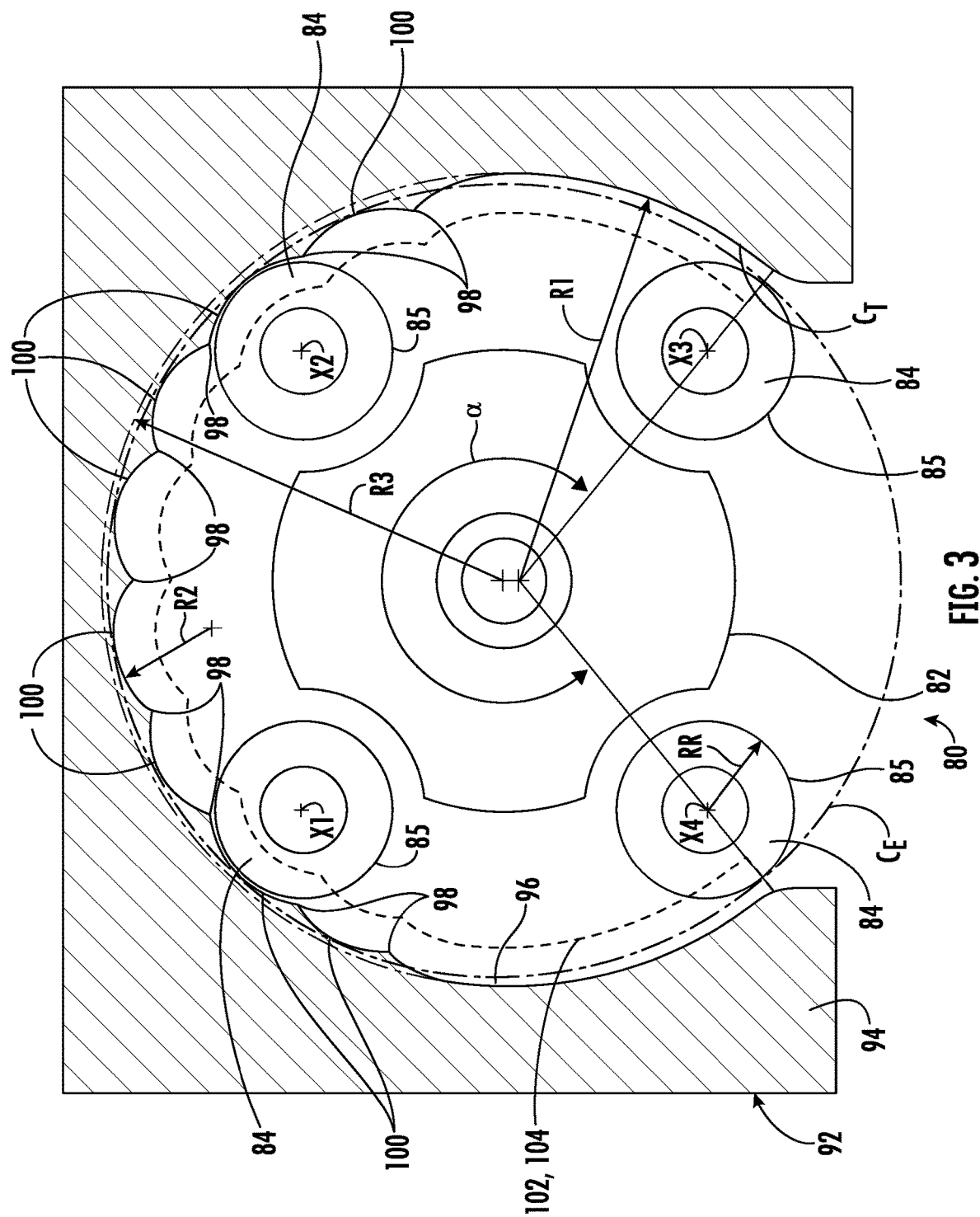
FIG. 3 is a cross-sectional view through the self-damping carrier basket pivot connection shown in FIG. 2.
Figure 4:
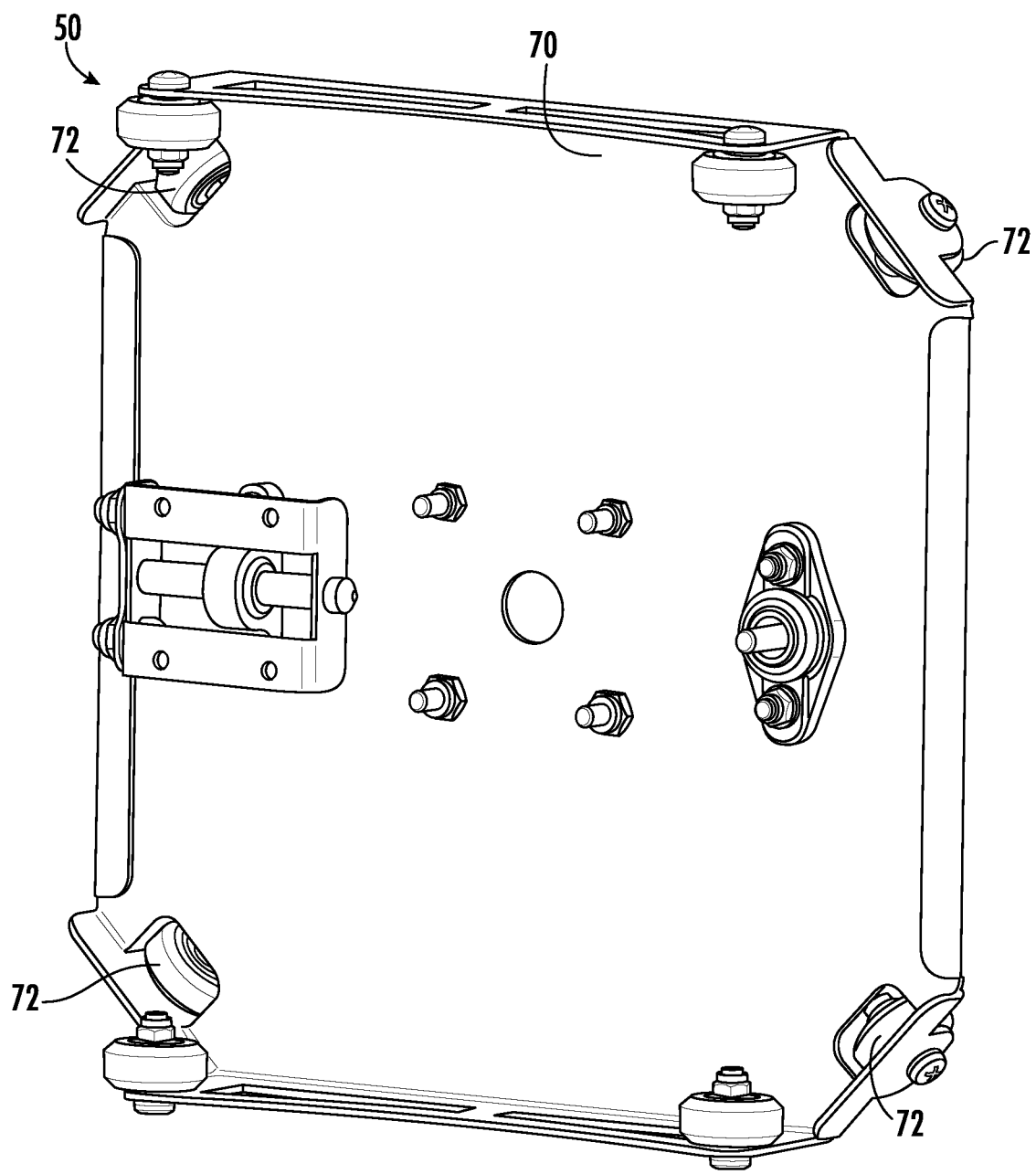
FIG. 4 is a rear view of a support plate used in connection with a carrier basket transporter system according to the present disclosure on which the self-damping carrier basket pivot connection may be mounted.
Figure 5:
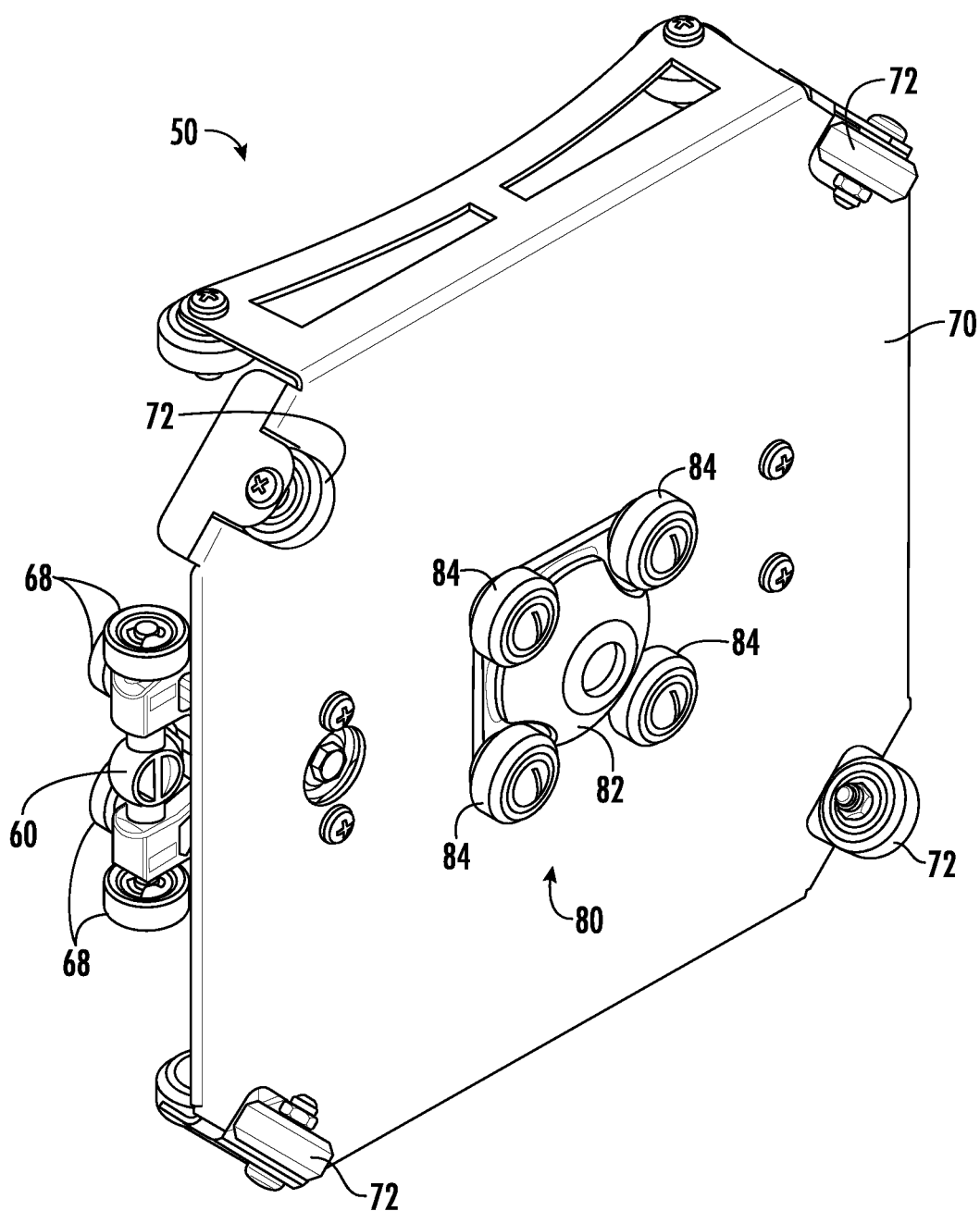
FIG. 5 is a front perspective view of the carrier basket support plate shown in FIG. 4 which is adapted for connection to two of the cars in order to provide enhanced load carrying ability for the carrier basket.
Figure 6:
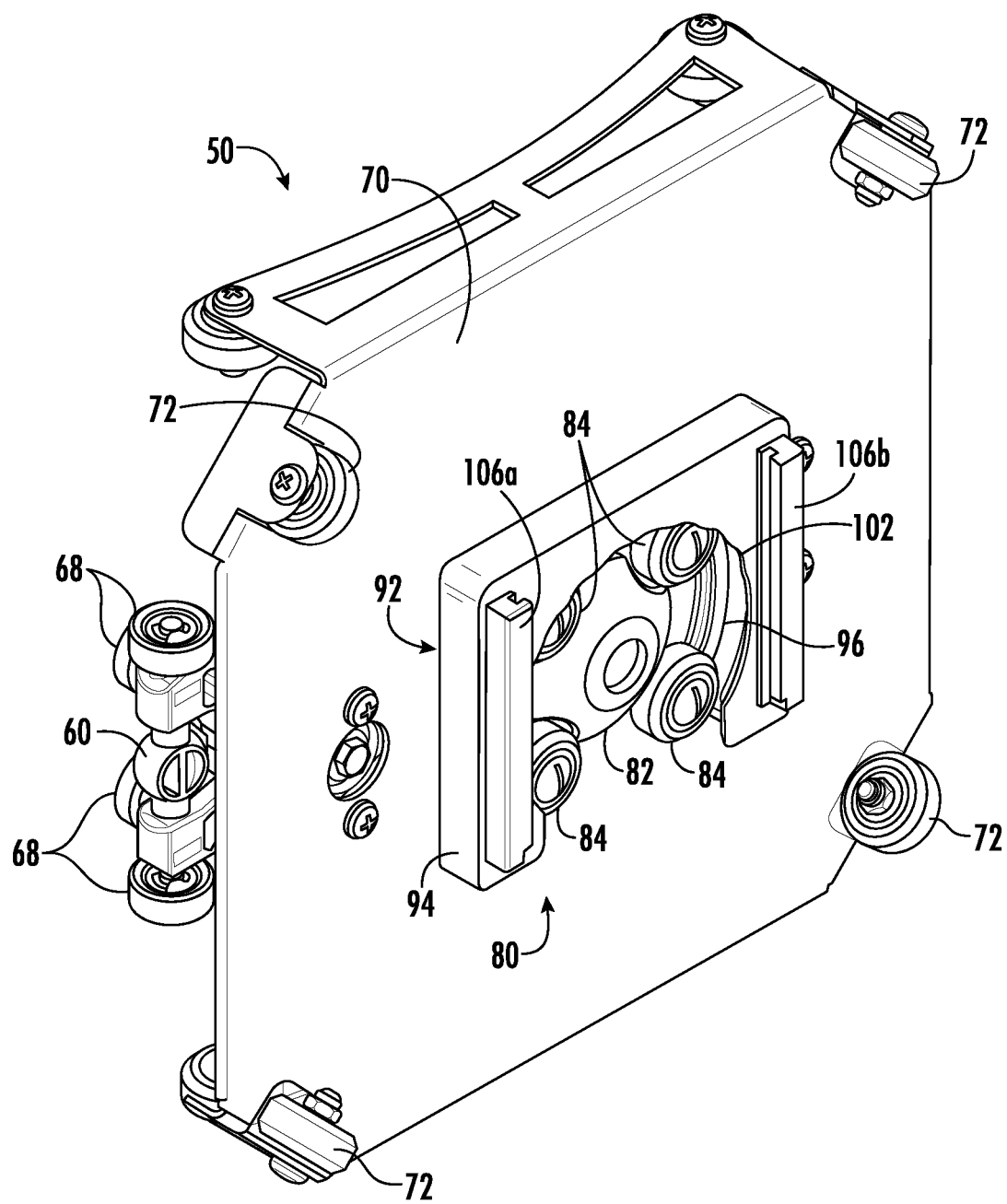
FIG. 6 is a perspective view similar to a FIG. 5 showing the self-damping carrier basket pivot connection mounted on the support plate along with the housing of the self-damping carrier basket pivot connection to which the carrier basket, for example is shown in FIGS. 8 and 13-16 can be connected.
Figure 7:
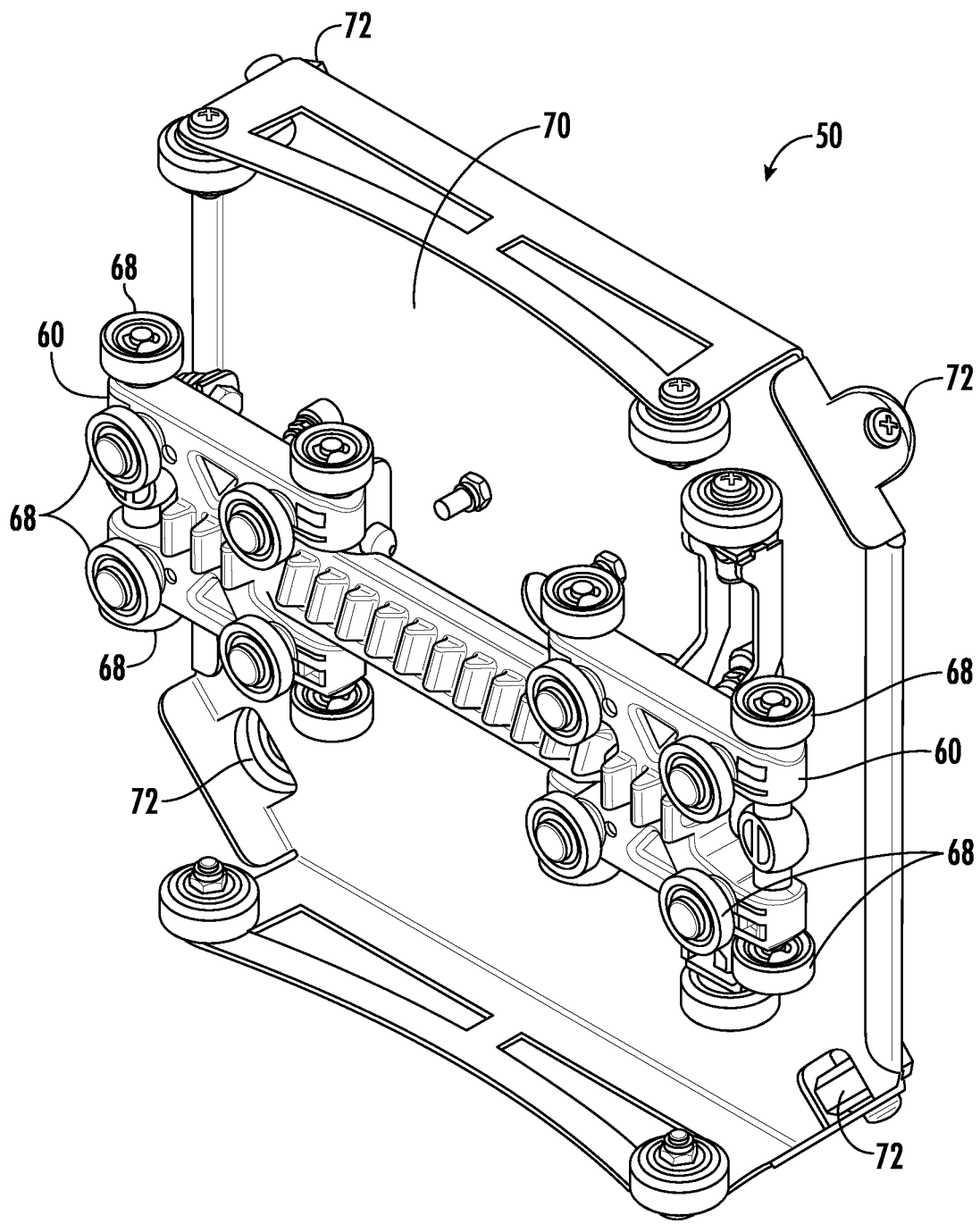
FIG. 7 is a rear view of the support plate shown in FIGS. 4-6, showing the connection to two of the cars that travel along the pathway of the carrier basket transporter system according to the present disclosure.
Figure 8:
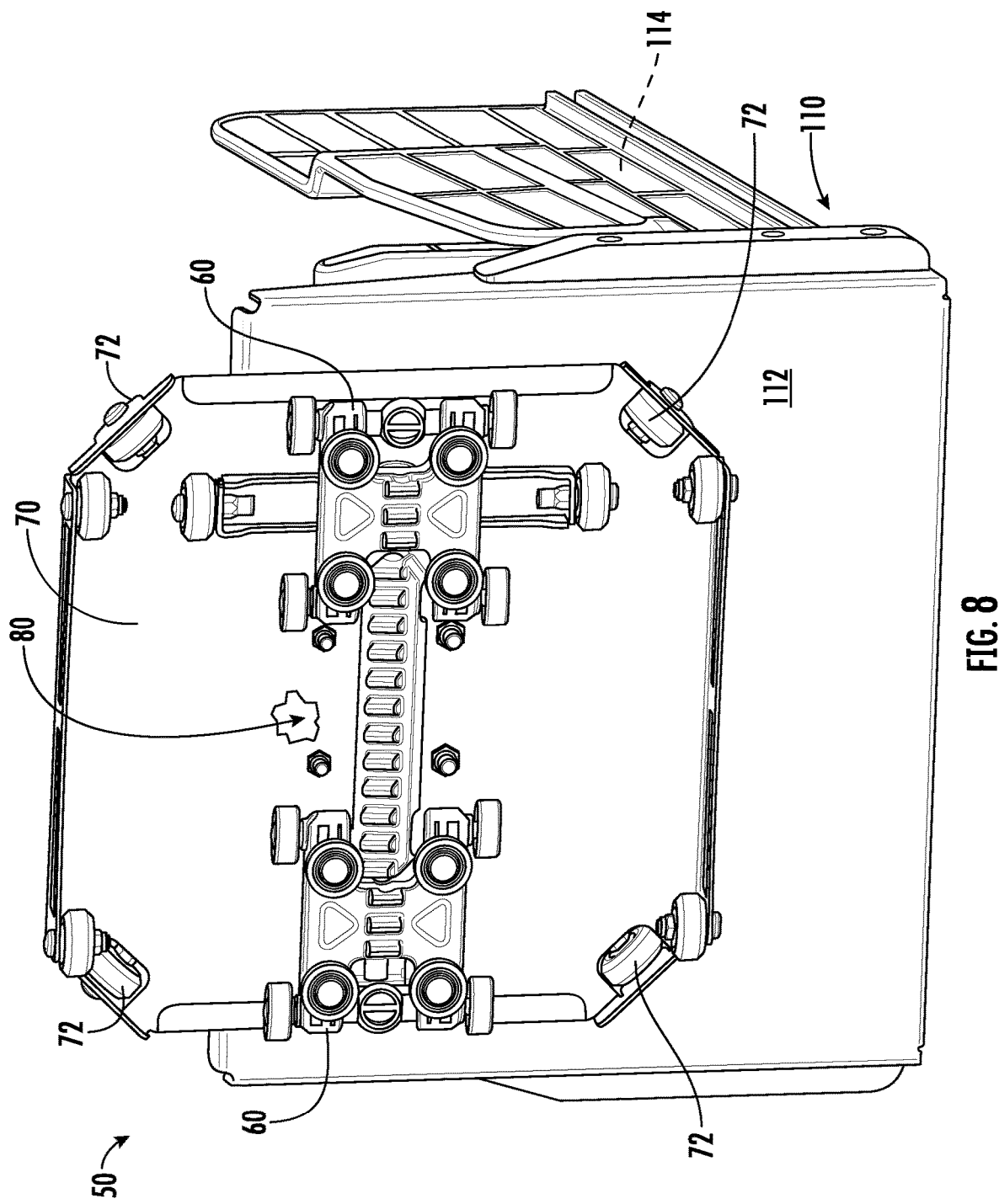
FIG. 8 is a rear perspective view similar to FIG. 7 showing a carrier basket in connection with the support plate.

As shown in detail in FIGS. 2, 3, and 6, the self-damping carrier basket pivot connection 80 includes a support connection 82 that is configured for attachment to at least one of the cars 60. The support connection 82 comprises at least three connection rollers 84 that define a circular envelope $C_E$. A mating connection 92 is configured to be attached to a back support 112 of the carrier basket 110, for example as shown in FIGS. 13-16. The mating connection 92 comprises a housing 94 having a part circular track 96 that is generally defined by a first radius R1 and extends circumferentially greater than 180°, preferably greater than 225°, and more preferably about 270°. The part circular track 96 generally corresponds to or is larger than the circular envelope $C_E$ defined by the at least three connection rollers 84. The part circular track 96 includes at least one inwardly directed protrusion 98, and more preferably, a series of inwardly directed protrusions 98.

Still with reference to FIGS. 2 and 3, the connection rollers 84 are engaged in the part circular track 96 such that the carrier basket 110 is adapted to be pivotable by gravity so a product support surface 114 thereof, shown in FIGS. 13-16, is maintained generally horizontal during movement of the carrier basket 110 along the pathway 56. The at least one inwardly directed protrusion 98, and preferably the series of inwardly directed protrusions 98, provide an increased resistance to relative movement between the housing 94 and the at least one of the rollers 84 that contacts at least one inwardly directed protrusion 98.

As shown in detail in FIGS. 2 and 3, in the preferred embodiment, there are four of the connection rollers 84, and two or possibly more of the inwardly directed protrusions 98 may be in contact with respective ones of the connection rollers 84 at any given time, depending upon the position of the housing 94 relative to the connection rollers 84.

As shown in FIG. 3, where four of the connection rollers 84 are provided, they are preferably arranged with the axes $X_1$-$X_4$ thereof defining corners of a square.

In a particularly preferred embodiment, the inwardly directed protrusions 98 are formed by ends of arc-shaped segments 100 which have a second radius R2 that is smaller than the first radius R1 and that define a portion of the part circular track 96 and are arranged generally at a distance of the first radius R1 such that the inwardly directed protrusions 98 extend radially inwardly from the circle $C_T$ defined by the first radius R1.

In a preferred embodiment, the connection rollers 84 have a roller radius RR and the second radius R2 is greater than or equal to the roller radius RR.

In a preferred embodiment, in order to allow pivoting movement of the housing 94 relative to the connection rollers 84, the circle $C_T$ preferably has a greater diameter than the circle $C_E$ in order to provide clearance for the housing 94 with the part circular track 96 to move slightly upwardly as the connection rollers 84 pass over one or more of the inwardly directed protrusions 98 prior to the housing 94 dropping back downwardly as one or more of the connection rollers 84 move into the spaces between the protrusions 98 as the carrier basket 110 pivots. The center of the envelope circle $C_E$ can also be offset from the center of the circle $C_T$ that generally defines the part circular track 96.

In the preferred embodiment shown in FIGS. 2 and 3, there are at least six of the arc-shaped segments 100, and more preferably there are eight of the arc-shaped segments 100 as shown. These arc-shaped segments 100 are located at a top part of the housing 94, preferably above the center of the part circular track 96, opposite to the open space in the area outside of the part circular track 96. This open space can be used to assist in assembly of the housing 94 on to the connection rollers 84.

Still with reference to FIGS. 2, 3, and 6, the housing 94 preferably includes first and second lips 102, 104 that extend radially inwardly along each side of the part circular track 96 that retain the housing 94 on the connection rollers 84.

As previously noted, the circular envelope $C_E$ has a radius R3 that is preferably smaller than the first radius R1 of the part circular track 96.

One particular advantage of this arrangement is that the self-damping carrier basket pivot connection 80 allows the carrier basket 110 to maintain a horizontal position when carrying an unbalanced or off-center load. The amount of the off-center or unbalanced load that can be accommodated before the self-damping carrier basket pivot connection 80 pivots (which is desirable for transitioning around vertical curves) is dependent on the weight of the load as well as the geometry of the connection rollers 84 and the part circular track 96 with its inwardly directed protrusion 98, which can be adjusted to suit the particular application.

In one embodiment, the connection rollers 84 may optionally include an outer surface 85 that is made of an elastomeric material. This would allow the connection rollers to compress at least somewhat, in order to allow a transition over one or more of the inwardly directed protrusions 98 as the angle of the carrier basket 110 changes due to transitions around vertical curves in the pathway 56, and gravity acting on the carrier basket 110 overcomes the resistance force created by contact of the at least one of the connection rollers 84 with respective protrusion(s) 98. However, this is not required, and the transition of the connection rollers 84 over one or more of the inwardly directed protrusions 98 as the angle of the carrier basket 110 changes due to transitions around vertical curves in the pathway 56 can just be carried out by raising the housing 94 and attached carrier basket 110 upwardly as described above.

As shown in detail in FIGS. 2 and 6, the housing 94 preferably includes a carrier basket connector 106. This can be provided by two grooved tracks 106a, 106b into which a corresponding segment on the back support 112 of the carrier basket 110 engages.

Referring to FIGS. 7-16, a carrier basket transporter system 50 is shown which includes the plurality of cars 60 which are configured to travel along the pathway 56 with at least one of the cars 60 having a self-damping carrier basket pivot connection 80 connected thereto, as discussed above.

In the carrier basket transporter system 50, in one preferred embodiment a support plate 70 is connected to two of the cars 60, and the support connection 82 is connected to the support plate 70. In this preferred embodiment, support rollers 72 are located on the support plate 70 and at least one of the support rollers 72 is configured to contact the back support 112 of the carrier basket 110 at a location spaced apart from the support connection 82. Using this arrangement, greater loads can be carried by the carrier basket 110. Further, the self-damping carrier basket pivot connection 80 prevents undue swaying of the carrier basket 110 when it is loaded due to the configuration of the connection rollers 84 contacting at least one of the inwardly directed protrusions 98. This is particularly useful for damping swaying movements as the carrier basket 110, which is preferably provided with a product support surface 114 that comprises a plurality of spaced apart fingers 116, transitions to the loading or unloading station, such as 40 and 42 discussed above, in order to prevent interference between the carrier basket fingers 116 and the support fingers 44 located on the loading and/or unloading station 40, 42.

In a further preferred embodiment, car 60 include track rollers 68 that are configured to ride on a track 57 that defines the pathway 56. While track rollers 68 are preferred for low friction movement of the cars 60, it is also possible to provide low-friction sliders.

It will be appreciated that the foregoing is presented by way of illustration only and not by way of any limitation. It is contemplated that various alternatives and modifications may be made to the described embodiments without departing from the spirit and scope of the invention. Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the ap-pended claims rather than by the foregoing description, and all alternate embodiments and changes to this embodiment which come within the meaning and range of equivalency of said claims are therefore to be embraced therein.

The invention claimed is:

1. A self-damping carrier basket pivot connection for a carrier basket transporter system with a plurality of cars configured to travel along a pathway, at least some of which have a carrier basket pivotally connected thereto, the self-damping carrier basket pivot connection comprising:
   a support connection configured for attachment to at least one of the cars, the support connection comprises at least three connection rollers that define a circular envelope;
   a mating connection configured to be attached to a back support of the carrier basket, the mating connection comprises a housing having a part circular track having a first radius and that extends circumferentially greater than 180° and generally corresponds to or is larger than the circular envelope, the part circular track including at least one inwardly directed protrusion; and
   the connection rollers are engaged in the part circular track such that the carrier basket is adapted to be pivotable by gravity so a product support surface of the carrier basket is maintained generally horizontal during movement of the carrier basket along the pathway, and the at least one inwardly directed protrusion provides an increased resistance to relative movement between the housing and at least one of the rollers that contacts the at least one inwardly directed protrusion.

2. The self-damping carrier basket pivot connection of claim 1, wherein the connection rollers include an outer surface made of an elastomeric material.

3. The self-damping carrier basket pivot connection of claim 1, wherein the at least three connection rollers includes four of the connection rollers arranged with axes thereof defining corners of a square.

4. The self-damping carrier basket pivot connection of claim 1, wherein the at least one inwardly directed protrusion comprises a plurality of the inwardly directed protrusions.

5. The self-damping carrier basket pivot connection of claim 1, wherein the inwardly directed protrusions are formed by ends of arc-shaped segments having a second radius, smaller than the first radius, that define a portion of the part circular track and are arranged generally at a distance of the first radius such that the inwardly directed protrusions extend radially inwardly from a circle defined by the first radius.

6. The self-damping carrier basket pivot connection of claim 5, wherein the connection rollers have a roller radius and the second radius is greater than or equal to the roller radius.

7. The self-damping carrier basket pivot connection of claim 5, wherein there are at least six of the arc-shaped segments.

8. The self-damping carrier basket pivot connection of claim 5, wherein the arc-shaped segments are located at a top part of the housing.

9. The self-damping carrier basket pivot connection of claim 8, wherein a bottom part of the housing is open.

10. The self-damping carrier basket pivot connection of claim 1, further comprising first and second lips that extend radially inwardly along each side of the part circular track that retain the housing on the connection rollers.

11. The self-damping carrier basket pivot connection of claim 1, wherein the circular envelope has a radius that is smaller than the first radius of the part circular track.

12. The self-damping carrier basket pivot connection of claim 1, wherein the housing includes a carrier basket connector.

13. A carrier basket transporter system, comprising:
a plurality of cars configured to travel along a pathway, at one of the cars having a self-damping carrier basket pivot connection connected thereto,
the self-damping carrier basket pivot connection including a support connection attached to the one of the cars, the support connection comprises at least three connection rollers that define a circular envelope;
a carrier basket having a back support and a product support surface extending therefrom, and a mating connection attached to the back support, the mating connection including a housing having a part circular track having a first radius and that circumferentially extends greater than 180° and generally corresponds to or is larger than the circular envelope, the part circular track including at least one inwardly directed protrusion; and
the connection rollers are engaged in the part circular track such that the carrier basket is pivotable by gravity so the product support surface is maintained generally horizontal during movement of the carrier basket along the pathway, and the at least one inwardly directed protrusion provides an increased resistance to relative movement between the housing and at least one of the connection rollers that contacts the at least one inwardly directed protrusion.

14. The system of claim 13, further comprising a support plate connected to two of the cars, and the support connection is attached to the support plate.

15. The system of claim 14, further comprising support rollers located on the support plate, at least one of which is configured to contact the back support at a location spaced apart from the support connection.

16. The system of claim 13, wherein the product support surface comprises a plurality of spaced apart fingers.

17. The system of claim 13, wherein the cars include track rollers that are configured to ride on a track that defines the pathway.

* * * * *